UNITED STATES PATENT OFFICE.

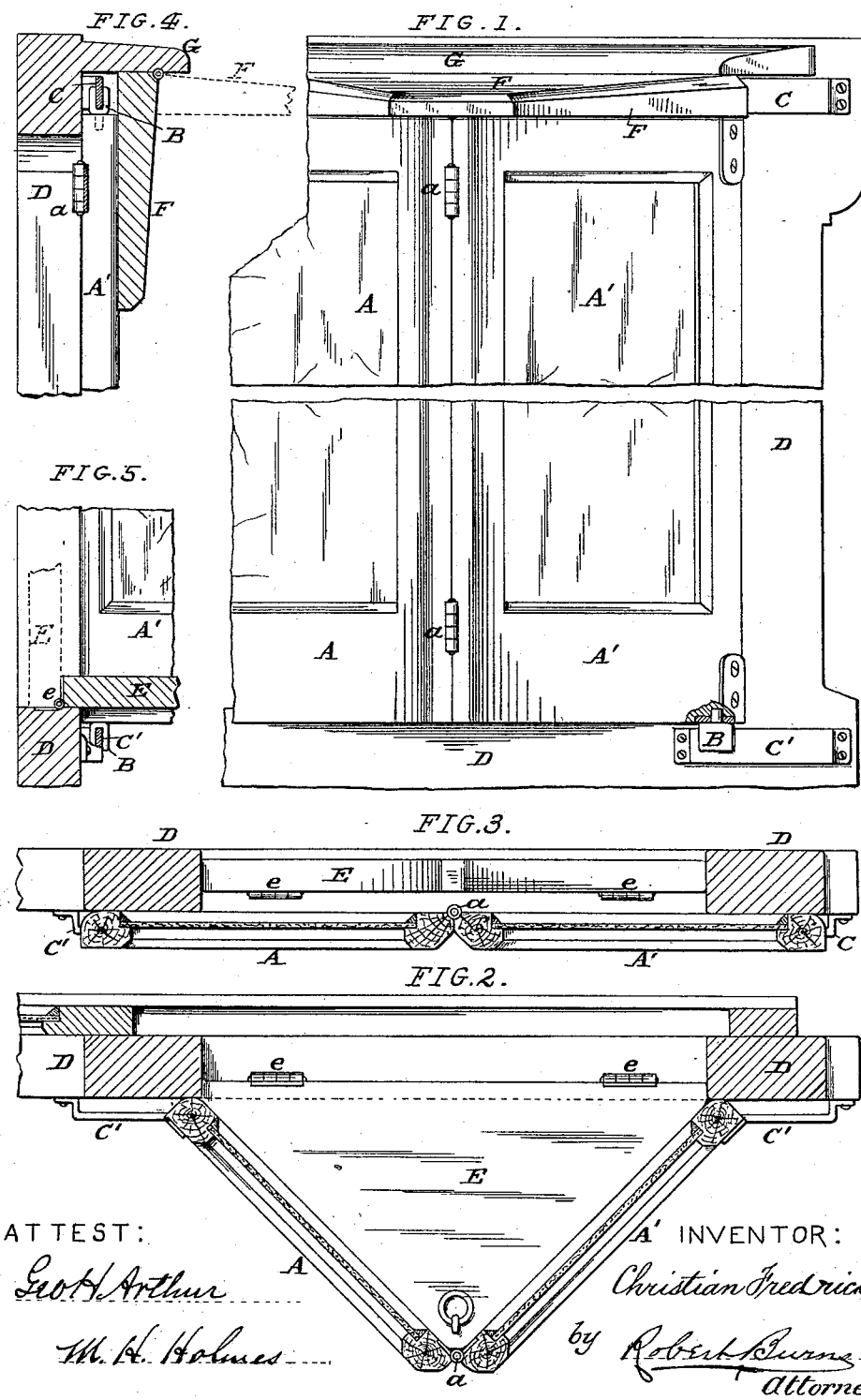

CHRISTIAN FREDRICKSON, OF CHICAGO, ILLINOIS.

FOLDING BAY-WINDOW.

SPECIFICATION forming part of Letters Patent No. 422,585, dated March 4, 1890.

Application filed November 9, 1889. Serial No. 329,777. (No model.)

*To all whom it may concern:*

Be it known that I, CHRISTIAN FREDRICKSON, a citizen of the United States, residing at Chicago, in the county of Cook and State of Illinois, have invented certain new and useful Improvements in Folding Bay-Windows, of which the following is a specification.

The object of the present invention is to provide a folding bay-window construction more especially adapted for use on the sides of locomotive-cabs, way-cars, and the like, to furnish shelter and protection from the weather to a party in the cab or car taking a forward or rearward observation, and which is capable of being readily and easily folded flat against the side of the cab to constitute an ordinary window for the same when desired. I attain such object by the construction and arrangement of parts illustrated in the accompanying drawings, in which—

Figure 1 is a front elevation of my improved bay or angular window in its angular condition; Fig. 2, a horizontal section of the same; Fig. 3, a similar view with the parts folded flat against the side of the cab or car; Fig. 4, a detail transverse section of the upper portion of the window, and Fig. 5 a similar view of the lower part of the same.

Similar letters of reference indicate like parts in the several views.

As represented in the drawings, my improved bay-window consists of two glazed frames or sashes A A', hinged together at their meeting edges by means of hinges $a$, so as to enable them to move into an angular position with relation to each other, their other or free end being provided with swiveled slides B, that move on and are guided by longitudinal track-sections C C', secured to the side D of the locomotive-cab or other car, so that these last-mentioned ends will be always in contact with such side or wall.

It is preferred to make both of the sashes A A' move on the track-sections C C', as illustrated in the drawings, yet in some cases one of the sashes may be arranged on a fixed pivot or hinge and the other sash made to move the entire longitudinal distance to effect the desired angular adjustment of the sashes without departing from the spirit of my invention.

The floor of the window in its angular condition is formed by a board or frame E, glazed or unglazed, as desired, pivoted in a longitudinal direction to the frame of the cab by hinges $e$, so as to swing out laterally, and is made of an angular shape corresponding with that formed by the sashes A and A'.

The roof or canopy for the window is formed by a hinged board or frame F, hinged under the stationary hood G, on the outside of the side wall D, as shown.

When the sashes A A' are drawn flat against the side wall D to constitute an ordinary window for the same, as indicated in Fig. 3, the floor-frame E will be drawn up into a vertical position, as indicated in dotted lines in Fig. 5, while the roof or canopy board F will hang down vertically outside the sashes A A', as indicated in Fig. 4, and may be provided with a suitable cord extending to the inside of the cab, so that such canopy board can be secured in its last-mentioned position.

In effecting an angular adjustment of the sashes A A' to constitute a bay-window or lateral look-out at the side of the cab, it is only necessary to push the floor-frame E from its vertical position into a horizontal position, as in its movement it will force the sashes A A' out angularly, and the sashes in turn will lift the roof or canopy frame F into proper horizontal position.

Having thus fully described my said invention, what I claim as new, and desire to secure by Letters Patent, is—

1. A folding angular or bay window for locomotive-cabs and the like, comprising in combination a pair of sash A A', hinged together at their meeting edges and having swivel-slides B at their free ends, top and bottom track-sections C C', secured to the side wall of the cab, &c., and a floor frame or board E hinged to the side wall, essentially as described, and for the purpose set forth.

2. A folding angular or bay window for locomotive-cabs and the like, comprising in combination a pair of sash A A', hinged together at their meeting edges and having swivel-slides B at their free ends, top and bottom track-sections C C', secured to the side wall of the cab, &c., a floor frame or board E, hinged to the side wall, and a roof or canopy board F, hinged to the under side of the stationary hood G on the side wall, essentially as described, and for the purpose set forth.

In testimony whereof witness my hand this 2d day of November, 1889.

CHRISTIAN FREDRICKSON.

In presence of—
ROBERT BURNS,
GEO. H. ARTHUR.